US008373590B1

(12) United States Patent
Piré

(10) Patent No.: US 8,373,590 B1
(45) Date of Patent: Feb. 12, 2013

(54) METHOD AND A SYSTEM FOR PROCESSING AND DISPLAYING IMAGES OF THE SURROUNDINGS OF AN AIRCRAFT

(75) Inventor: Richard Edgard Claude Piré, Istres (FR)

(73) Assignee: Eurocopter, Marignane Cedex (FR)

( * ) Notice: Subject to any disclaimer, the term of this patent is extended or adjusted under 35 U.S.C. 154(b) by 1398 days.

(21) Appl. No.: 11/962,143

(22) Filed: Dec. 21, 2007

(30) Foreign Application Priority Data

Dec. 21, 2006 (FR) ...................................... 06 11217

(51) Int. Cl.
*G01S 13/93* (2006.01)
*G01S 13/94* (2006.01)
*G01S 13/00* (2006.01)

(52) U.S. Cl. ................ 342/29; 342/27; 342/61; 342/63; 342/65; 342/66; 342/175; 342/176; 342/179; 342/182; 342/195; 382/100; 701/1; 701/3; 701/300; 701/301; 340/945; 340/961; 340/963

(58) Field of Classification Search .................... 342/27, 342/28, 70–72, 175, 176, 179, 195, 29, 61–66, 342/118–123, 182; 701/300, 301, 1, 3; 382/100, 382/103; 348/61, 143, 148; 340/425.5, 435–438, 340/459, 461, 945, 961, 963
See application file for complete search history.

(56) References Cited

U.S. PATENT DOCUMENTS

| 4,602,336 | A | * | 7/1986 | Brown | 701/300 |
| 5,341,142 | A | * | 8/1994 | Reis et al. | 342/64 |
| 5,949,331 | A | * | 9/1999 | Schofield et al. | 340/461 |
| 6,115,651 | A | * | 9/2000 | Cruz | 701/1 |
| 6,327,522 | B1 | * | 12/2001 | Kojima et al. | 701/1 |
| 7,084,871 | B2 | | 8/2006 | Jardin et al. | |
| 7,126,460 | B2 | * | 10/2006 | Yamada | 340/435 |
| 7,425,693 | B2 | * | 9/2008 | Shapira | 342/175 |
| 7,518,490 | B2 | * | 4/2009 | Takenaga et al. | 340/435 |
| 7,668,374 | B2 | * | 2/2010 | Harder et al. | 342/29 |
| 7,925,391 | B2 | * | 4/2011 | Sanders-Reed | 701/3 |
| 2002/0171739 | A1 | * | 11/2002 | Yamada | 348/148 |

FOREIGN PATENT DOCUMENTS

| EP | 0 373 979 A1 | 6/1990 |
| FR | 2 780 380 A1 | 12/1999 |
| FR | 2 826 762 A1 | 1/2003 |
| FR | 2 870 422 A1 | 11/2005 |

* cited by examiner

*Primary Examiner* — Bernarr Gregory
(74) *Attorney, Agent, or Firm* — Brooks Kushman P.C.

(57) ABSTRACT

The invention relates to a method of processing an image sensed by an image sensor on board an aircraft fitted with an obstacle-locator system, in which the position and the extent of a zone in the sensed image, referred to as the zone of interest, is determined as a function of obstacle location data delivered by the obstacle-locator system, after which at least one parameter for modifying the brightness of points/pixels in said zone of interest is determined to enable the contrast to be increased in said zone of interest, and as a function of said modification parameter, the brightness of at least a portion of the image is modified.

17 Claims, 2 Drawing Sheets

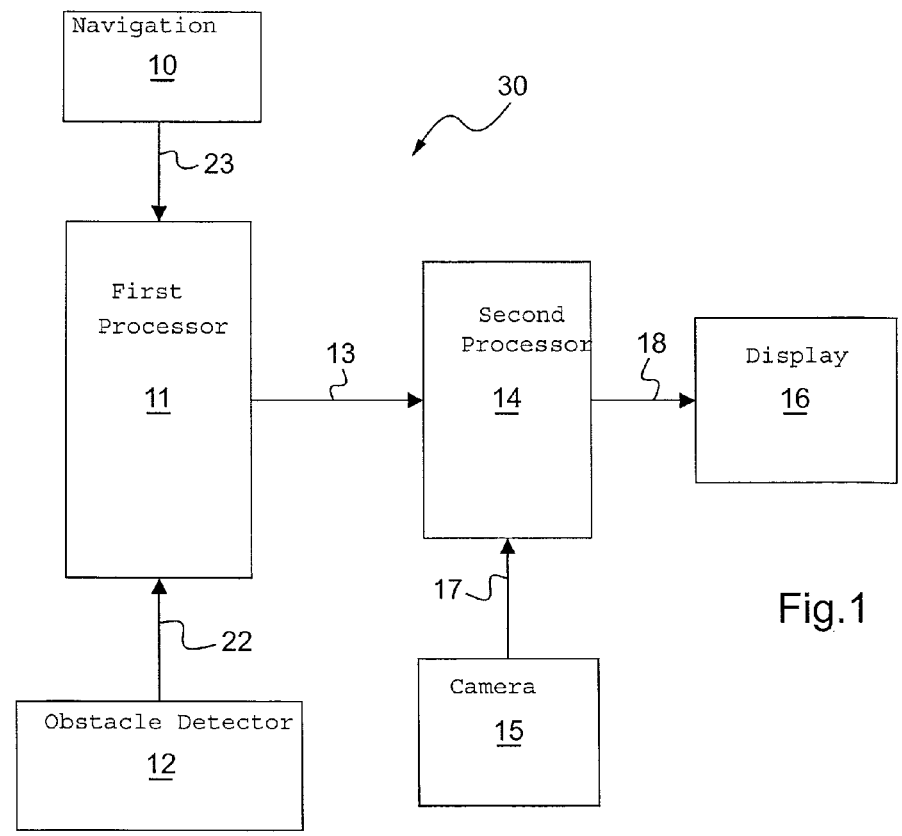
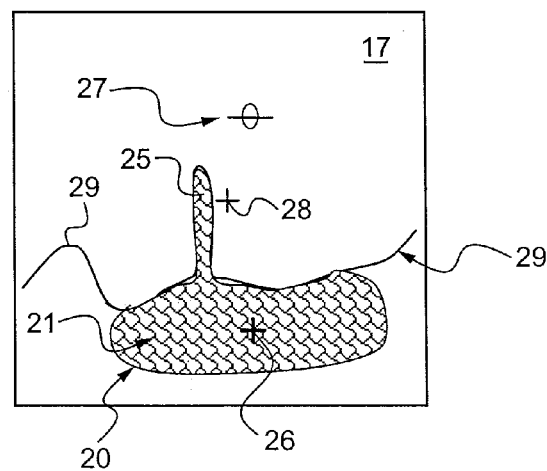
Fig.1
Fig.2

Fig.3
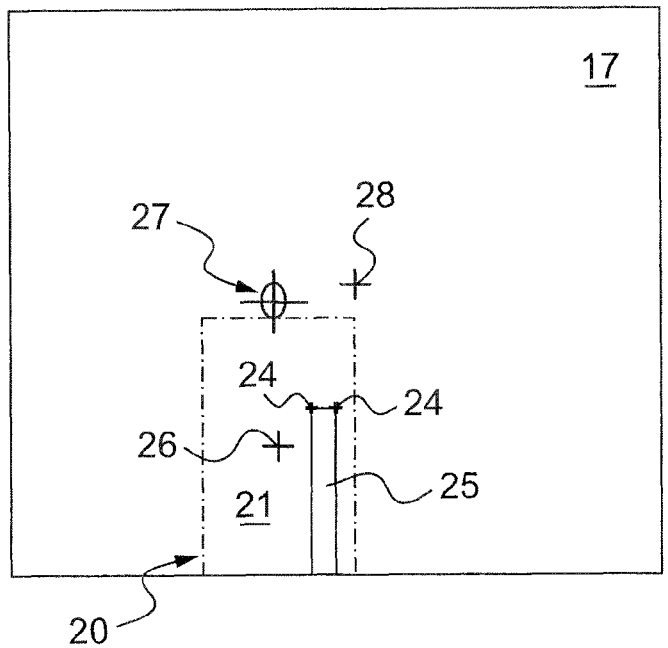
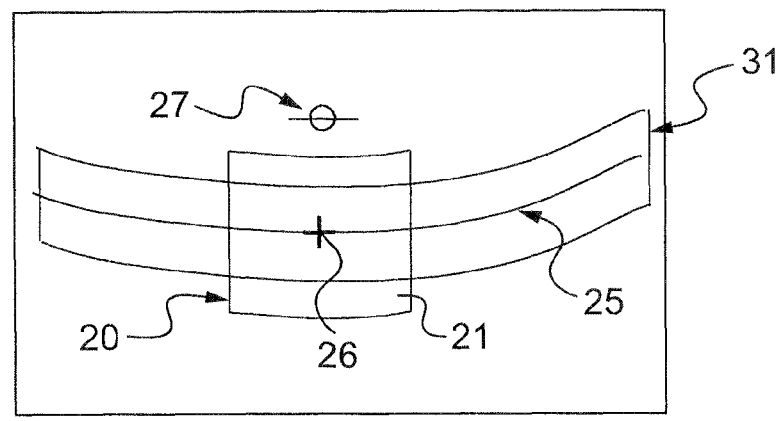
Fig.4

METHOD AND A SYSTEM FOR PROCESSING AND DISPLAYING IMAGES OF THE SURROUNDINGS OF AN AIRCRAFT

The present invention relates to a method and to apparatus (or a system) for processing and/or displaying images, on board an aircraft, showing the aircraft surroundings.

The technical field of the invention is that of fabricating systems for providing assistance in piloting and that are fitted on board rotorcraft.

BACKGROUND OF THE INVENTION

The present invention relates more particularly to a system for providing assistance in piloting that delivers to the crew an image of the external scene that has been processed and optimized for flying at low altitude.

It is difficult to provide the crew of an aircraft with an optimal image of the external scene suitable for enabling the aircraft to fly as close as possible to obstacles so as to carry out a contour flight (for civilian or military purposes), or a tactical flight (for military purposes) under conditions of poor visibility or at night.

The piloting systems that are presently proposed possess numerous limitations and do not make it possible to present dangerous obstacles to the crew of an aircraft in optimum manner.

The present invention lies in the context of providing assistance in enabling an aircraft to avoid obstacles, a field that has given rise to a variety of proposals.

In patent FR-2 780 380, proposals are made to form a pseudo-image from information relating to the topography of the aircraft's surroundings, which information is delivered by an on-board sensor such as a radar or a laser sensor. Analyzing the range associated with each point (pixel) in the pseudo-image enables those points that are closest to the aircraft to be highlighted.

Proposals are made in patent DE-10 065 180, to use information obtained by processing images delivered by one or more cameras on board an aircraft in order to detect the presence of another aircraft and predict is trajectory, in order to avoid a collision between the two aircraft. The image processing includes compressing and adapting contrast.

Other patents propose modifying an image of the external surroundings as a function of information that results from measuring distances:
  patent FR 2 712 215 proposes superposing on an image of the external scenery—in the visible or the infrared region of the spectrum—, signs, symbols, or curves of positions that result from processing telemetry data that specifies the tops of dangerous obstacles that have been detected (by telemetry); and
  U.S. Pat. No. 6,243,482 proposes mixing the outlines of obstacles determined by processing telemetry data with a basic image sensed by a natural vision system; the processing applied to the telemetry image is high-pass filtering.

The invention seeks to improve that kind of system for processing images delivered by a (piloting) camera prior to displaying those images.

OBJECTS AND SUMMARY OF THE INVENTION

In accordance with an aspect of the invention, there is proposed a method of processing an image delivered by a camera as a function of obstacle position data, which data may be the result of telemetry measurements performed in the field of observation of the camera, in which method the gain (i.e. the contrast) and/or the offset (i.e. the brightness) of all or part of the image is/are adjusted in application of one or more adjustment parameters determined as a function of the distribution of the brightness of points/pixels in only a portion—or window—of the image, the position of said portion—or window—in the image being determined in particular on the basis of the obstacle position data.

In other words, and in another aspect of the invention, there is proposed a method of processing an image of the surroundings of an aircraft in which, within said image, a window or zone of interest is determined as a function of the coordinates, in a pseudo-image formed from telemetry measurements in a solid angle corresponding to the field of view represented by the image, relating to obstacles that have been detected and/or selected as a function of their danger, i.e. their proximity to the current position of the aircraft or to the predicted trajectory of the image. Since said zone of interest comprises several contiguous/adjacent pixels, and in particular several tens or hundreds of contiguous/adjacent pixels, at least one parameter is subsequently determined for modifying the brightness of the points/pixels in said window or zone of interest for the purpose of increasing contrast in said window or zone of interest, and said modification parameter is then used for modifying the brightness of at least a portion of the image.

According to other aspects and characteristics of the invention that are preferred:
  in order to process an image sensed by an image sensor installed on board an aircraft fitted with an obstacle-locator system, the position and the extent, in particular the outline, of a zone in the sensed image, referred as a zone of interest, is determined as a function of obstacle location data delivered by the obstacle-locator system, with at least one contrast modification parameter/data item being determined to enable the contrast of the zone of the sensed image to be increased so as to obtain a sensed image zone of accentuated contrast, and the brightness of all of the points in the sensed image is modified in application of a relationship depending on said contrast modification data item so as to obtain a modified sensed image (that can be presented to a member of the aircraft crew);
  the position and the extent of the zone of the sensed image are determined as a function of obstacle location data and as a function of navigation data delivered by an on-board navigation system;
  the range, the elevation, and the relative bearing of terrain points situated ahead of the aircraft are measured by telemetry in order to obtain obstacle location data and in order to determine the position and/or extent of the zone of interest;
  the data is read from an (on-board) database concerning the terrain and/or obstacles in order to obtain obstacle location data and in order to determine the position and/or extent of the zone of interest;
  an outline is determined for the zone of interest, this outline being polygonal and/or curvilinear, in part or in full;
  the position and/or outline of the zone of interest is determined for which the bearing of the center of said zone is close to (corresponds substantially to) the bearing of the velocity vector of the aircraft, or else for which the center of said zone is close to (corresponds substantially to) the center of the modified sensed image as presented to the crew;
  the position and/or the outline of the zone of interest is determined so that a portion of the outline of said zone is close to (corresponds substantially to) a safety curve calculated from the obstacle location data and as a function of the current position and of the predicted trajectory and/or of the velocity vector of the aircraft;

the safety curve is calculated with zero guard height, the curve resting on the tops of dangerous obstacles relative to the current position and to the predicted trajectory and/or to the velocity vector of the aircraft; and a technique of pixel intensity histogram equalization is used in the zone of interest to accentuate the contrast of the zone of interest, which technique may subsequently be applied to the entire sensed image.

The distribution of pixel histograms may be modified by a linear or a multilinear relationship that is a function of the minimum brightness and of the maximum brightness of points in the zone of interest. It is also possible to modify this distribution by means of a linear relationship that is a function of the standard deviation and of the average of the brightness of the points of the zone of interest.

At least some of the operations of methods of the invention can be implemented by an electronic data processor unit, such as a computer, that operates under the control of a program.

Thus, in another aspect of the invention, a program is proposed that comprises code recorded on a medium—such as a memory—or embodied by a signal, the code being readable and/or executable by at least one data processor unit—such as a processor on board an aircraft or suitable for mounting on board the aircraft, in order to modify images of the aircraft's surroundings sensed by an on-board image sensor, the code including code segments for performing operations of a method as described herein.

In another aspect and preferred embodiment of the invention, there is proposed a program that is usable (readable and/or executable) by a processor (i.e. a data processor unit) on board an aircraft, the processor being arranged to cooperate with—in particular to be connected to—an on-board image sensor such as a camera and also with an on-board system for providing obstacle position data, the system possibly comprising a telemeter such as a radar or a lidar, so as to receive firstly image data and secondly data concerning the elevation, bearing, and range between the aircraft and any obstacle(s) situated in the field of observation of the image sensor, said elevation-bearing-range data enabling a pseudo-image to be formed that matches at least in part in terms of direction and field of view with an image delivered be the image sensor.

The program may include at least one code segment for determining the coordinates (abscissa or bearing and ordinate or elevation) of at least one point of the pseudo-image that corresponds to an obstacle, at least one segment of code that for determining at least one point/pixel of an image sensed by the image sensor that corresponds to the point of the pseudo-image, and at least one segment of code for determining a window or zone of interest including the point/pixel as determined in this way in the sensed image; the program further includes one or more code segments for increasing contrast in the zone of interest in the sensed image.

To this end, the code segments can be used for histogram equalization, i.e. for modifying the intensity of the pixels in the zone of interest alone, in such a manner that the distribution of pixel (or point) intensity in the window (or zone of interest) is distributed or in equilibrium.

The relationship as determined in this way for modifying brightness intensity and that is optimized for the window of interest can subsequently be applied to the entire sensed image.

The invention makes it possible automatically to adjust the contrast and/or the brightness of at least a portion of a sensed image so as to accentuate the visibility of the portion of the image that includes the detected obstacles, regardless of their nature or their position relative to the horizon and/or relative to the line joining together the tops, by means of the image processing performed on the portion of the image that is preferably substantially centered, in bearing and/or in elevation, on one or more obstacles detected in directions close to the direction in which the aircraft is moving—corresponding to its "velocity vector".

This automatic modification of sensed images can be implemented in real time so as to compensate for rapid variations in contrast and brightness due firstly to variations in the direction of observation as a result in particular of changes in the attitude of the aircraft, and secondly to the variety of scenes that are observed and in particular: sky, land, sea, or temperature of the scene (when using infrared imaging).

This automatic processing improves the quality of images delivered to the crew and improves the intelligibility of symbols representative of obstacles that may be superposed on the image of the observed scene, as described in above-mentioned patent FR 2 712 251.

The invention is particularly adapted to rotary wing aircraft performing a "contour" flight or a tactical flight.

BRIEF DESCRIPTION OF THE DRAWINGS

Other aspects, characteristics, and advantages of the invention appear in the following description which refers to the accompanying drawings and which shows, without any limiting character, preferred implementations of the invention.

FIG. 1 is a diagram showing the main components and the architecture of a system/device of the invention.

FIG. 2 is a diagram illustrating the application of the method of the invention to an environment that includes an obstacle of interest (a pylon) that stands out against a "ground" background.

FIG. 3 is a diagram illustrating the application of a method of the invention to an environment that includes an obstacle (a pylon) that stands out against a "sky" background.

FIG. 4 is a diagram showing the application of a method of the invention to an environment including a filamentary aerial obstacle such as an overhead electric cable.

MORE DETAILED DESCRIPTION

The invention serves in particular to perform "intense" image processing to provide a piloting video that emphasizes contrast in a zone of interest calculated from signals or data delivered by a "remote" image sensor and by a piloting sensor (AHRS/GPS or INS).

The position and the extent of the zone of interest may be calculated as a function of the position and the extent of a safety cordon with a non-zero guard height (or tops of dangerous obstacles), as described in above-mentioned patent FR 2 712 251.

The invention can be implemented using known video image processing techniques, in particular using techniques for increasing contrast by cumulated histograms and/or filtering high spatial frequencies in the image data; such filtering serves to amplify sudden changes of intensity between two successive pixels, and reinforces the outlines of obstacles (filamentary obstacles in particular). Such processing is generally applied only to the zone of interest.

In an aspect of the invention, image processing is proposed that is optimized for one or more zones of interest in a piloting image, with the positions and the extents of these zones being determined as a function of knowledge about the tops of dangerous obstacles or of obstacles of interest as determined by processing at least one pseudo-image (or "range" image) generated from telemetric measurements.

The following usual abbreviations are used herein:

AHRS: attitude and heading reference system; GPS: global positioning system, making use of satellites;

HDD: head-down display;

HMS/D: helmet-mounted sight/display;

HUD: head-up display, i.e. a system for superimposing information for the pilot when flying with the head "up";

INS: inertial navigation system;

LIDAR: light detection and ranging;

OWS: obstacle warning system; and

RADAR: radio detection and ranging.

Imaging technologies (in the infrared in particular) are used in aviation for improving the perception of the surroundings outside the aircraft by the crew, particularly at night or in conditions of bad visibility. "All-weather" piloting cameras are fitted for this purpose to civilian aircraft (the enhanced vision system (EVS)), and to military aircraft.

Since the scene observed by a piloting camera varies during a flight (variation in the ground/sky ratio, variable scene temperature, overflying land or sea), automatic image processing including setting the gain and the offset of the image as sensed serves to reduce the work load on the crew.

Existing image processing systems for piloting cameras and existing systems for assisting the piloting of an aircraft are based on statistical analysis of the image as sensed. Those systems do not give complete satisfaction because the obstacles of interest, i.e. obstacles that are dangerous (in terms of flying safety) are poorly perceived.

In an implementation of the method of the invention, the contrast of a "privileged" zone of a sensed image is increased, said zone being determined as a function of coordinates in a pseudo-image that is "superposable" on the sensed image, and formed by "raw plots" given by an obstacle detector of the LIDAR or RADAR type, a scanning telemeter camera, or an instantaneous telemeter camera known as a "snapshot".

The obstacle detector serves to determine the portion(s) of a pseudo-image that correspond(s) to the object(s) constituting the greatest danger; after the pseudo-image has been put into correspondence with a sensed image, in terms of direction and field of view (aperture), this makes it possible to determine a zone of interest in the sensed image, and in particular to center the zone of interest on the corresponding portion of the image that contains one or more obstacles that are determined as being dangerous given the trajectory of the aircraft.

Thus, accentuating the contrast of the sensed image portion that corresponds to the zone of interest serves to make the dangerous obstacles stand out in the sensed image as modified in this way and that is presented to the pilot.

With reference to FIG. 1 in particular, the on-board system 30 of the invention comprises an aircraft positioning and navigation system 10 such as an AHRS (or an INS) coupled to a GPS, together with a system 12 for locating obstacles that are dangerous for the aircraft.

The system 12 may comprise a telemeter, an obstacle database, and/or a terrain numerical model.

The system 30 includes a camera 15 for observing the surroundings outside the aircraft, ahead of the aircraft, and a display member 16 for displaying images for the attention of a (co)pilot.

The system 30 also has two signal/data processor units 11, 14: the first processor unit 11 is connected to the systems 10 and 12 to receive therefrom respectively aircraft navigation and position data 23, and data 22 locating points on the ground that are liable to constitute obstacles for the aircraft.

The second processor unit 14 is connected to the first processor unit 11, to the sensor 15 delivering sensed image data 17, and to the display 16 to which the unit 14 delivers the signals/data for display representing the sensed image as modified in accordance with the invention.

On the basis of the data 22 and 23, the unit 11 determines definition data 13, i.e. the position and the extent of a zone of interest, and transmits this data 13 to the unit 14. The unit 14 optimizes the contrast of the portion of the sensed image 17 that corresponds to the zone 21 of interest, and causes the modified sensed image to be displayed.

When a safety curve/cordon 29 (FIG. 2) as calculated from the positions of detected obstacles 25 is presented/displayed superposed on the sensed image as processed in this way, the pilot can make a better correlation between the safety cordon and the associated obstacle that is shown contrasted on the sensed image of the external surroundings.

Advantageously, the center 26 of the zone 21 or window of interest can be positioned in relative bearing, either in the vicinity of the bearing of the current velocity vector 27 of the aircraft, as shown in FIGS. 3 and 4, or else in the vicinity of the center 28 of a screen for displaying the modified sensed image, as shown in FIG. 2, as a function of a selection that can be made manually by the pilot.

The center 26 of the zone 21 or window of interest may be positioned in elevation as a function of the bearing of a safety cordon 29 (advantageously filtered in the ground frame of reference and in the image frame of reference) as calculated on the basis of raw plots 22 coming from the obstacle detector 12.

The extent in bearing and in elevation of the field of view corresponding to the zone or window of interest may correspond respectively to the range of bearing values and to the range of elevation values of the detected dangerous obstacles and/or the safety curve.

Accentuating the contrast in the zone of interest can be based on the histogram equalization technique. Under such circumstances, gain can be linear, can be a function of an accumulated histogram, or can be multilinear (a method that is a combination of the two preceding methods).

Emphasizing high frequencies in a second zone of interest 31 situated around (extending in part above and in part below) a line interconnecting the tops of detected dangerous obstacles can serve to cause filamentary obstacles 25 to stand out, as shown in FIG. 4.

FIG. 2 shows a zone 21 of interest in which a top portion of the curvilinear outline 20 coincides substantially with a safety curve 29. FIG. 3 shows a zone of interest 21 of outline 20 that is rectangular, while the outline 20 in FIG. 4 comprises two vertical rectilinear segments interconnected by two superposed curvilinear segments.

What is claimed is:

1. A method of processing an image sensed by an image sensor on board an aircraft fitted with an obstacle-locator system, the method comprising:
   determining in the sensed image as a function of obstacle location data delivered by the obstacle-locator system, wherein the zone corresponds to an obstacle indicated by the obstacle location data;
   generating at least one parameter as a function of brightness of the zone; and
   using said modification parameter to modify the brightness of the zone to increase contrast of the zone and thereby generate a modified image in which visibility of the zone is accentuated for presentation to crew of the aircraft.

2. A method according to claim 1, wherein the zone in the sensed image is determined as a function of the obstacle location data and as a function of navigation data delivered by an on-board navigation system.

3. A method according to claim 1, wherein at least part of the obstacle location data is obtained from telemetry measurements.

4. A method according to claim 1, wherein at least part of the obstacle location data is obtained from a database having at least one of terrain data and obstacle data.

5. A method according to claim 1, further comprising determining an outline for the zone, which outline is at least partially polygonal.

6. A method according to claim 1, further comprising determining an outline for the zone, which outline is at least partially curvilinear.

7. A method according to claim 1, wherein the zone is determined so that the bearing at the center of said zone is close to the bearing of the velocity vector of the aircraft.

8. A method according to claim 1, wherein the zone is determined so that the center of said zone is close to the center of the modified image.

9. A method according to claim 1, wherein the zone is determined so that a portion of the outline of said zone is close to a safety curve based on the obstacle location data and the current position and predicted trajectory of the aircraft.

10. A method according to claim 9, wherein the safety curve has zero guard height.

11. A method according to claim 1, wherein the image includes a plurality of pixels, wherein modifying the brightness of the zone to increase the contrast of the zone includes equalizing a histogram of pixel intensity in the zone for accentuating contrast in the zone.

12. A method according to claim 11, wherein distribution of pixel histograms is modified by a linear relationship that is a function of minimum and maximum brightness intensity of the pixels in the zone.

13. A method according to claim 11, wherein distribution of pixel histograms is modified by a multilinear relationship that is a function of minimum and maximum brightness intensity of the pixels in the zone.

14. A method according to claim 11, wherein distribution of pixel histograms is modified by a linear relationship that is a function of the standard deviation and of the average of the brightness intensity of pixels in the zone.

15. A method according to claim 1, further comprising applying the modification parameter to the entire sensed image.

16. A method according to claim 1, further comprising highlighting high spatial frequencies in the zone situated around a line joining together the tops of the obstacle.

17. A system for assisting the piloting of an aircraft, the system comprising:
   an image sensor configured to generate an image of an environment of an aircraft;
   an obstacle-locator system configured to generate obstacle location data indicative of obstacles in the environment of the aircraft;
   a processor configured to receive the image and the obstacle location data and to determine a zone in the image as a function of the obstacle location data, wherein the zone corresponds to an obstacle indicated by the obstacle location data;
   the processor further configured to generate a parameter as a function of brightness of the zone and use the modification parameter to modify the brightness of the zone to increase the contrast of the zone and thereby generate a modified image in which visibility of the zone is accentuated for presentation to crew of the aircraft.

* * * * *